(12) United States Patent
Chan et al.

(10) Patent No.: US 7,136,292 B1
(45) Date of Patent: Nov. 14, 2006

(54) POWER SUPPLY AND METHOD FOR REGULATING SUPPLY VOLTAGE

(75) Inventors: Tuck Meng Chan, Singapore (SG); Xiaowu Gong, Singapore (SG); Jing Hu, Singapore (SG); Meng Kiat Jeoh, Singapore (SG); Kok Kee Lim, Singapore (SG); Junyang Luo, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 11/192,982

(22) Filed: Jul. 29, 2005

(51) Int. Cl.
*H02M 3/335* (2006.01)
*H02M 7/44* (2006.01)

(52) U.S. Cl. .................. 363/21.09; 363/21.1; 363/97
(58) Field of Classification Search ............ 363/21.04, 363/21.08, 21.09, 21.1, 21.11, 97, 131
See application file for complete search history.

(56) References Cited

U.S. PATENT DOCUMENTS

| | | | | |
|---|---|---|---|---|
| 4,963,814 A * | 10/1990 | Parks et al. | ................ | 323/274 |
| 5,627,460 A * | 5/1997 | Bazinet et al. | ............... | 323/288 |
| 5,812,383 A | 9/1998 | Majid et al. | | |
| 5,912,552 A * | 6/1999 | Tateishi | ....................... | 323/285 |
| 6,288,524 B1 * | 9/2001 | Tsujimoto | ................... | 323/285 |
| 6,307,356 B1 * | 10/2001 | Dwelley | ..................... | 323/282 |
| 6,456,050 B1 * | 9/2002 | Agiman | ....................... | 323/282 |
| 6,580,258 B1 * | 6/2003 | Wilcox et al. | .............. | 323/282 |
| 6,587,357 B1 | 7/2003 | Halamik et al. | | |
| 6,804,158 B1 * | 10/2004 | Ooishi | ........................ | 365/222 |
| 7,030,596 B1 * | 4/2006 | Salerno et al. | .............. | 323/282 |

\* cited by examiner

*Primary Examiner*—Bao Q. Vu
(74) *Attorney, Agent, or Firm*—Slater & Matsil, L.L.P.

(57) ABSTRACT

In a preferred embodiment, there is provided a switched mode power supply operable in start-up mode, normal mode and standby mode. The power supply may comprise a transformer having a primary winding on a primary side and a secondary winding on a secondary side, the primary winding being coupleable to a DC input voltage, and circuitry on the secondary side being arranged to provide a DC output voltage; and a power controller. The power controller may comprise a regulation controller for regulating a DC supply voltage on a supply line during standby mode, and a high voltage device coupled to the DC input voltage and the supply line. The current through the high voltage device to the supply line, during standby mode, may be controlled by the regulation controller. During standby mode, when the supply voltage is greater than or equal to a reference voltage, the current through the high voltage device to the supply line is substantially zero. When the supply voltage is less than the reference voltage, the greater the difference between the supply voltage and the reference voltage, the greater the current through the high voltage device to the supply line. In other preferred embodiments, there is also provided the power controller itself and a method for regulating a supply voltage during standby mode.

27 Claims, 9 Drawing Sheets

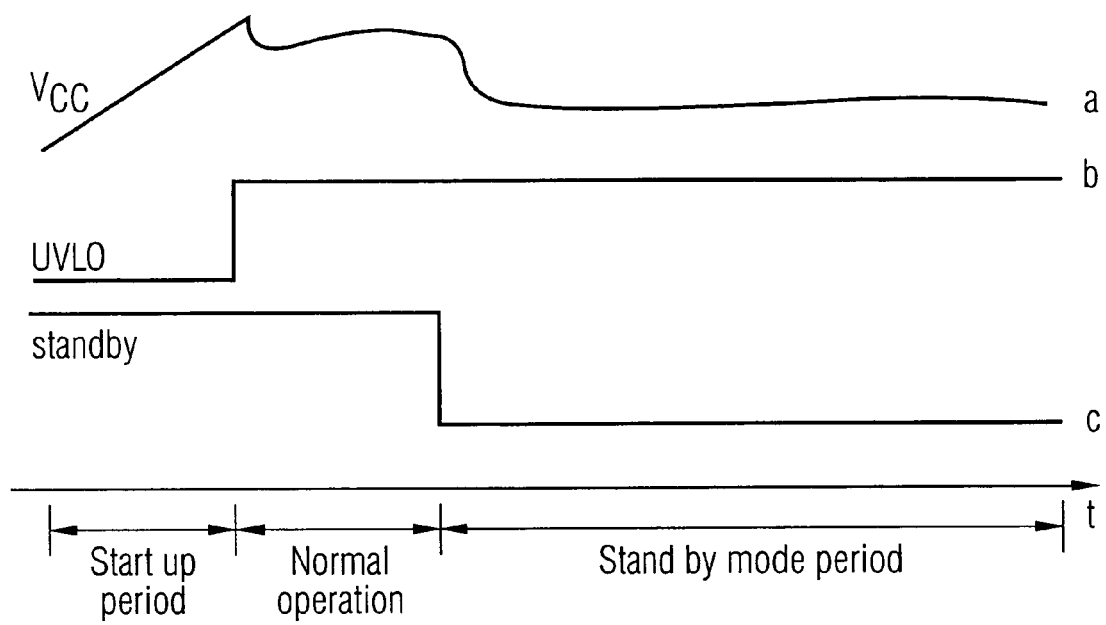

POWER SUPPLY AND METHOD FOR REGULATING SUPPLY VOLTAGE

TECHNICAL FIELD

The invention relates to switched mode power supplies and methods for regulating supply voltage.

BACKGROUND

Many electronic devices use switched mode power supplies due to their higher power efficiency and smaller physical size compared to other types of power supply. Switched mode power supplies are also advantageous in that these supplies can provide regulated output voltages having magnitudes higher than or lower than the unregulated input supply and can also supply different outputs of different voltages.

In a switched mode power supply system, a controller integrated circuit (IC) is used to generate the switching signal. To power the controller IC, different schemes can be found. U.S. Pat. No. 6,587,357, which is incorporated herein by reference, describes one known switched mode power supply system and method of powering the controller IC and is shown in FIG. 1. Referring to FIG. 1, the switched mode power supply includes a primary circuit portion 20, a secondary circuit portion 30, a self-supply power controller 40 and a feedback circuit 38. The primary circuit portion 20 includes a power source 22 and a primary inductive winding 24 coupled to the power source 22 at one end and to the self-supply power controller 40 at the other end. The secondary circuit portion 30 includes a secondary inductive winding 32 (coupled to the primary inductive winding 24), a rectifier 34 and a filter capacitor 36. The self-supply power controller 40 includes a controllable power source 42, a comparator circuit 44, a controller 48, a power switch 52 and a reference supply voltage 56. If the power controller 40 is implemented in a single IC package, four pins generally are required, shown as P1, P2, P3 and P4.

During operation, the comparator 44 compares the voltage on supply line 54 with the reference voltage 56. Specifically, if the voltage on supply line 54 is less than or equal to a first voltage magnitude, the comparator 44 enables the controllable power source 42, which charges up the capacitor 46. As a result, the voltage on supply line 54 increases. On the other hand, if the voltage on supply line 54 is more than or equal to a second voltage magnitude, the comparator 44 disables the controllable power source 42. Due to the current consumption of the controller, the voltage on supply line 54 will fall.

The operation of the prior art arrangement of FIG. 1 is shown in FIG. 2. Between $t_0$ and $t_1$, the capacitor 46 is charging up, because the voltage on supply line 54 is lower than the first voltage magnitude so the output of the comparator 44 enables the controllable power source 42. At $t_1$, when the voltage on supply line 54 reaches the second voltage magnitude, the comparator output disables the controllable power source 42. Due to the current consumption of the controller, the voltage on supply line 54 will fall. At $t_2$, when the voltage on supply line 54 falls to the first voltage magnitude, the comparator circuit output enables the controllable power source, so that the capacitor starts to charge up again. Thus, the voltage on supply line 54 (which is the voltage across capacitor 46) fluctuates between the first and second voltage magnitudes during the whole period of operation. This cycle repeats until power is removed from the input of the primary circuit portion 20.

Note that, in the arrangement of U.S. Pat. No. 6,587,357, the controllable power source is either enabled or disabled. When it is enabled, there is a constant current flowing to charge up the capacitor. When it is disabled, the capacitor discharges due to consumption by the self-supply power controller 40.

Whilst the arrangement of U.S. Pat. No. 6,587,357, illustrated in FIGS. 1 and 2, is simple and easy to implement, it does have a number of disadvantages. Primarily, this type of self-supply power is quite inefficient because the power controller IC is always powered by the controllable power source, which is coupled to the high bus voltage (usually around 400V), and power consumption in the self-supply power source is quite high. Additionally, the high power consumption may cause thermal problems for the controller IC.

U.S. Pat. No. 5,812,383, which is incorporated herein by reference, shows another known switched mode power supply system and method of powering the controller IC and is shown in FIG. 3. FIG. 4 shows the variation of $V_{AUX}$ (equivalent to $V_{CC}$ in U.S. Pat. No. 6,587,357) with time and FIG. 5 shows variation of the voltage across the control output capacitor, $V_{AUX}$, burst mode signal S6 and the drive signal with time.

In the arrangement shown in FIG. 3, during normal operation the power supply is supplied by the auxiliary winding, and during standby mode the power supply is supplied by the self-supply current source. Therefore, there is no power consumption in the self-supply current source during normal operation. However, one major disadvantage of the U.S. Pat. No. 5,812,383 arrangement is that the output voltage is not well regulated during burst mode operation since an auto-restart concept is used, i.e., it is as if the power supply is starting up again in every single cycle. Because of this, the load response of the power supply during burst mode operation is poor.

SUMMARY OF THE INVENTION

Preferred embodiments of the invention may provide a switched mode power supply and a power controller for a switched mode power supply, which mitigate or substantially overcome the problems of known power supplies described above. Preferred embodiments of the invention may provide a method for regulating a supply voltage during standby mode, which mitigates or substantially overcomes the problems of known methods described above.

According to a first aspect of the invention, there is provided a power controller for a switched mode power supply, the power supply operable in start up mode, normal mode and standby mode, the power controller comprising a regulation controller for regulating a DC supply voltage on a supply line during standby mode; and a high voltage device coupled to a DC input voltage and the supply line, current through the high voltage device to the supply line, during standby mode, being controlled by the regulation controller; wherein, during standby mode, when the supply voltage is greater than or equal to a reference voltage, the current through the high voltage device to the supply line is substantially zero and, when the supply voltage is less than the reference voltage, the greater the difference between the supply voltage and the reference voltage, the greater the current through the high voltage device to the supply line.

With this power controller, the supply voltage during standby mode is steady and well regulated. When the supply voltage is greater than or equal to the reference voltage, there may be leakage current through the high voltage device but the current will still be substantially zero. When the supply voltage is less than the reference voltage, the greater the difference between the supply voltage and the reference voltage, the greater the current through the high voltage device to the supply line, i.e., for a large difference between the supply voltage and the reference voltage (if the supply voltage is much lower than the reference voltage), there is a large current, and for a small difference between the supply voltage and the reference voltage (if the supply voltage is only a small amount lower than the reference voltage), there is a small current.

In one embodiment, when the supply voltage is less than the reference voltage, the current through the high voltage device to the supply line is proportional to the difference between the supply voltage and the reference voltage, i.e., there is a linear relationship between the two. In that case, the regulation controller operates linearly and may be termed a linear regulation controller.

The regulation controller may comprise a comparator for comparing the supply voltage with the reference voltage. The comparator may be a differential amplifier.

The regulation controller may control the current through the high voltage device during standby mode by outputting a voltage across two output terminals. The voltage may be proportional to the difference between the supply voltage and the reference voltage. Thus, the difference between the supply voltage and the reference voltage is minimized. In that case, the output voltage of the regulation controller may be controlled by the output of the comparator.

Preferably, the regulation controller is arranged to be disabled when the power supply is operating in start-up mode or normal mode. Thus, the regulation controller is enabled only during standby mode. During normal mode and standby mode, the regulation controller is disabled.

In one preferred embodiment the power controller further comprises a current controller for increasing the DC supply voltage on the supply line during start-up mode.

In that embodiment, in a first case, the current through the high voltage device during start-up mode is controlled by the current controller. Thus, the current through the high voltage device is controlled by the regulation controller during standby mode and by the current controller during start-up mode. The current controller may control the current through the high voltage device during start-up mode by outputting a voltage across two output terminals. The voltage across the two output terminals of the current controller during start-up mode is preferably controlled so that the current through the high voltage device to the supply line, during start-up mode, is constant. Therefore, the DC supply voltage on the supply line increases at a constant rate during start-up.

In that embodiment, in a second case, the power controller further comprises a second high voltage device coupled to the DC input voltage and the supply line and the current through the second high voltage device during start-up mode is controlled by the current controller. Thus, the regulation controller controls the first high voltage device during standby mode and the current controller controls the second high voltage device during start-up mode. In that case, the current controller may control the current through the second high voltage device during start-up mode by outputting a voltage across two output terminals. That voltage across the two output terminals of the current controller during start-up mode is preferably controlled so that the current through the second high voltage device to the supply line, during start-up mode, is substantially constant.

Preferably, the current controller is arranged to be disabled when the power supply is operating in normal mode or standby mode. Thus, the current controller is enabled only during start-up mode. During normal mode and standby mode the current controller is disabled.

Preferably, the high voltage device is a MOSFET, the drain of the MOSFET being coupled to the DC input voltage and the source of the MOSFET being coupled to the supply line. In that case, if the regulation controller controls the current through the MOSFET during standby mode by outputting a voltage across two output terminals, those two output terminals may be coupled to the gate and source of the MOSFET. Similarly, if the current controller controls the current through the MOSFET during start-up mode by outputting a voltage across two output terminals, those two output terminals may be coupled to the gate and source of the MOSFET.

Alternatively, the high voltage device may be a Junction Field Effect Transistor (JFET), the drain of the JFET being coupled to the DC input voltage and the source of the JFET being coupled to the supply line. In that case, if the regulation controller controls the current through the JFET during standby mode by outputting a voltage across two output terminals, those two output terminals may be coupled to the gate and source of the JFET. Similarly, if the current controller controls the current through the JFET during start-up mode by outputting a voltage across two output terminals, those two output terminals may be coupled to the gate and source of the JFET.

According to a preferred embodiment of the invention, there is also provided a switched mode power supply operable in start-up mode, normal mode and standby mode comprising a power controller according to the first aspect of the invention.

According to a second aspect of the invention, there is provided a switched mode power supply operable in start-up mode, normal mode and standby mode, the power supply comprising a transformer comprising a primary winding on a primary side and a secondary winding on a secondary side; the primary winding being coupleable to a DC input voltage and circuitry on the secondary side being arranged to provide a DC output voltage; a regulation controller for regulating a DC supply voltage on a supply line during standby mode; and a high voltage device coupled to the DC input voltage and the supply line, current through the high voltage device to the supply line, during standby mode, being controlled by the regulation controller; wherein, during standby mode, when the supply voltage is greater than or equal to a reference voltage, the current through the high voltage device to the supply line is substantially zero and, when the supply voltage is less than the reference voltage, the greater the difference between the supply voltage and the reference voltage, the greater the current through the high voltage device to the supply line. With this arrangement, the standby mode supply voltage is steady.

The regulation controller may comprise a comparator for comparing the supply voltage with the reference voltage. The comparator may be a differential amplifier.

In one arrangement, the regulation controller controls the current through the high voltage device during standby mode by outputting a voltage across two output terminals. The voltage may be proportional to the difference between the supply voltage and the reference voltage so as to reduce the difference between the supply voltage and the reference voltage. In that case, the output voltage of the regulation controller may be controlled by the output of the comparator.

In a preferred embodiment, the power supply further comprises a current controller for increasing the DC supply voltage on the supply line during start-up mode.

In that embodiment, in a first case, the current through the high voltage device during start-up mode is controlled by the current controller. Thus, the current through the high voltage device is controlled by the regulation controller during standby mode and by the current controller during start-up mode. The current controller may control the current through the high voltage device during start-up mode by outputting a voltage across two output terminals. That voltage across the two output terminals of the current controller during start-up mode is preferably controlled so that the current through the high voltage device to the supply line, during start-up mode, is substantially constant, so the DC supply voltage on the supply line increases at a constant rate during start-up. The voltage across the two output terminals may be substantially constant.

In that embodiment, in a second case, the power controller further comprises a second high voltage device coupled to the DC input voltage and the supply line, and the current through the second high voltage device during start-up mode is controlled by the current controller. In that case, the current controller may control the current through the second high voltage device during start-up mode by outputting a voltage across two output terminals. The voltage across the two output terminals of the current controller during start-up mode is preferably controlled so that the current through the second high voltage device to the supply line, during start-up mode, is constant. The voltage across the two output terminals may be constant.

Preferably, the current controller is arranged to be disabled when the power supply is operating in normal mode or standby mode, and the regulation controller is arranged to be disabled when the power supply is operating in start-up mode or normal mode.

The high voltage device may be coupled to the DC input voltage via a voltage limiter.

In one embodiment, the high voltage device is a MOSFET, the drain of the MOSFET being coupled to the DC input voltage and the source of the MOSFET being coupled to the supply line. In that embodiment, if the regulation controller controls the current through the MOSFET during standby mode by outputting a voltage across two output terminals, those two output terminals may be coupled to the gate and source of the MOSFET. Similarly, if the current controller controls the current through the MOSFET during start-up mode by outputting a voltage across two output terminals, those two output terminals may be coupled to the gate and source of the MOSFET.

In another embodiment, the high voltage device is a JFET, the drain of the JFET being coupled to the DC input voltage and the source of the JFET being coupled to the supply line.

The power supply may further comprise a feedback circuit coupling the secondary side to the primary side. The feedback circuit may contain an opto-coupler.

The power supply may further comprise a check box coupled to the feedback circuit for checking when the power supply is switched to and from standby mode. The check box may be coupled to the regulation controller and be arranged to enable the regulation controller when the power supply is switched to standby mode from normal mode and disable the regulation controller when the power supply is switched from standby mode to normal mode.

According to a third aspect of the invention, there is provided a method for regulating a supply voltage on a supply line during standby mode, in a power supply operable in start-up mode, normal mode and standby mode, the method comprising providing a high voltage device coupled to a DC input voltage and the supply line; comparing the supply voltage with a reference voltage; wherein if the supply voltage is greater than or equal to the reference voltage, controlling current through the high voltage device to the supply line to be substantially zero; and wherein if the supply voltage is less than the reference voltage, controlling current through the high voltage device to the supply line, such that the greater the difference between the supply voltage and the reference voltage, the greater the current through the high voltage device to the supply line.

Features described in relation to one aspect of the invention may also be applicable to another aspect of the invention.

BRIEF DESCRIPTION OF THE DRAWINGS

For a more complete understanding of the present invention, and the advantages thereof, reference is now made to the following descriptions taken in conjunction with the accompanying drawing, in which:

FIG. 10 is a graph showing operation of the FIG. 6 arrangement.

DETAILED DESCRIPTION OF ILLUSTRATIVE EMBODIMENTS

Figure 1:
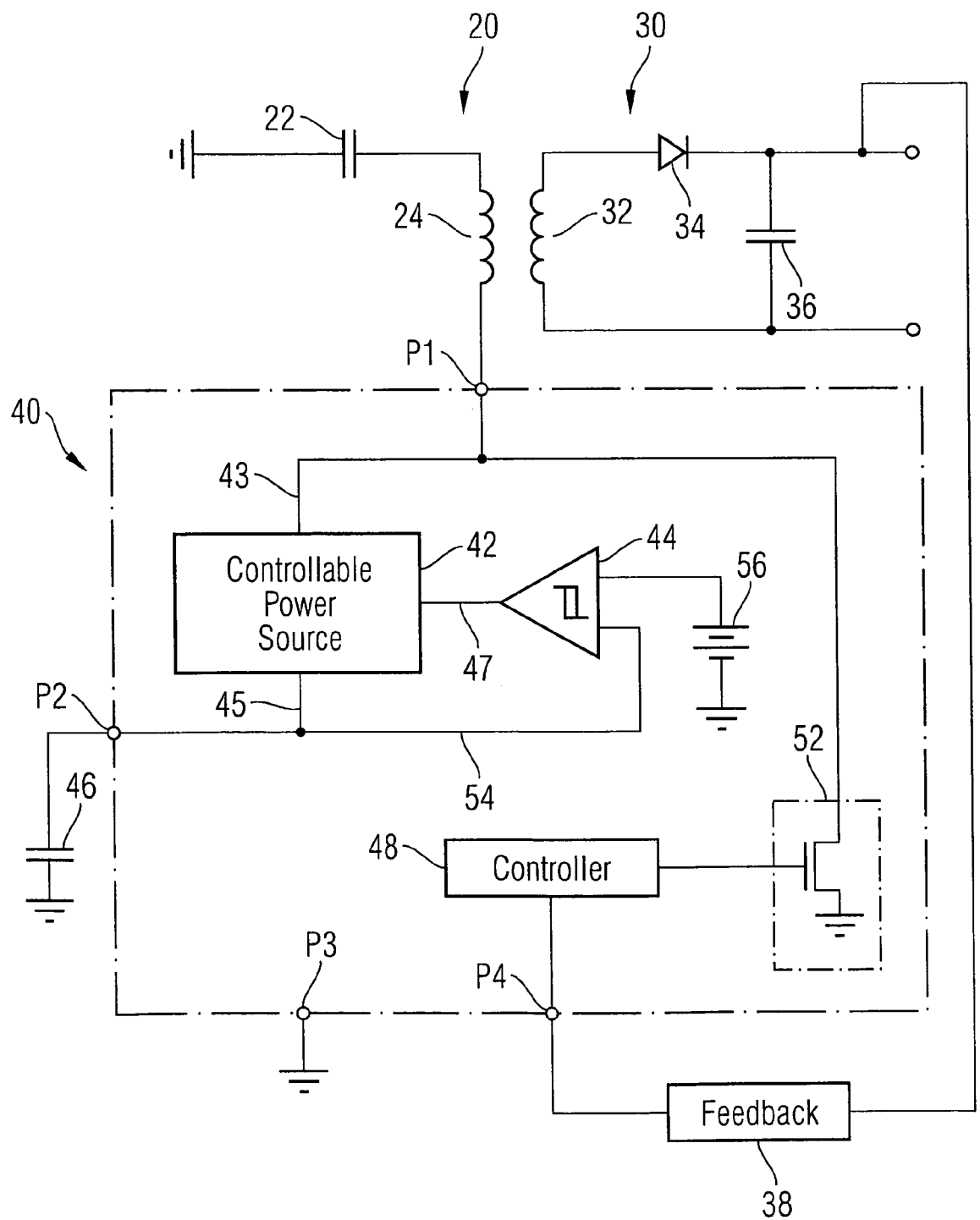
FIG. 1 is a diagram of a first known switched mode power supply.
Figure 2:
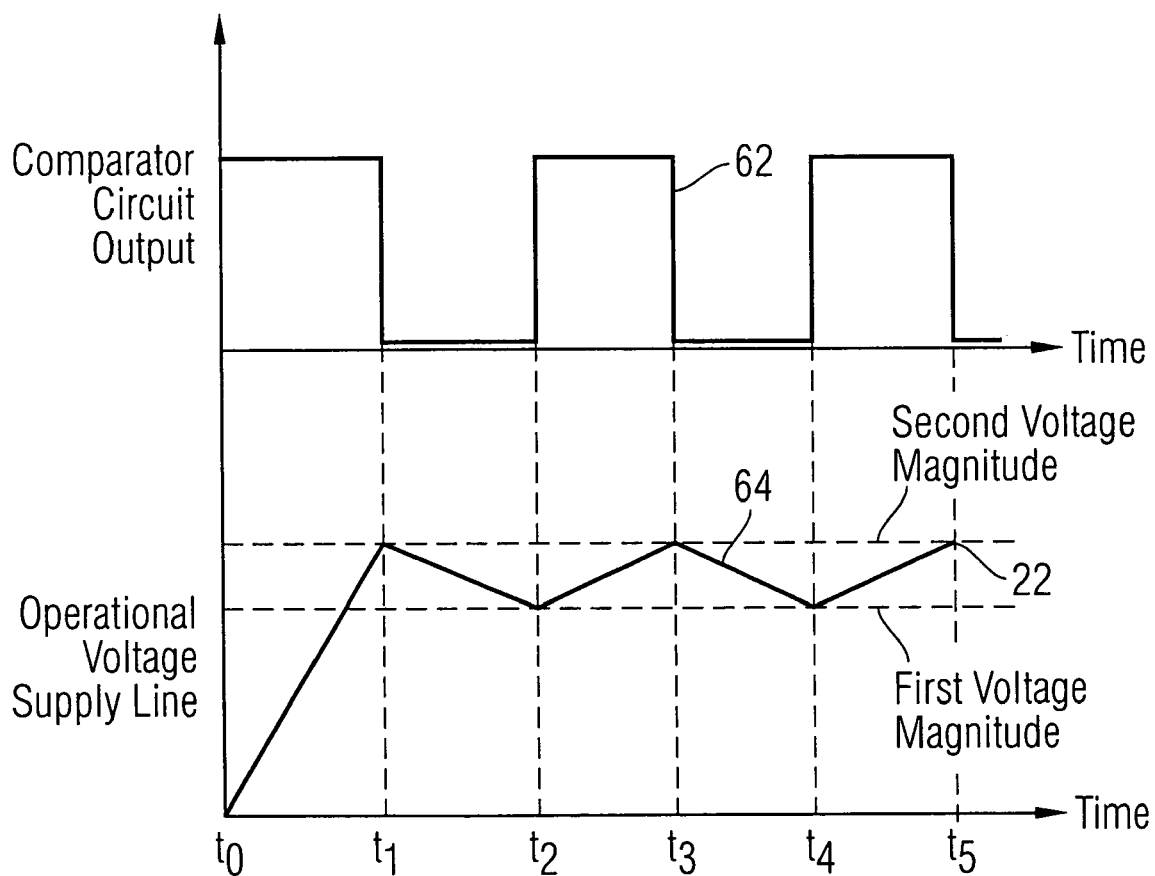
FIG. 2 is a graph showing operation of the arrangement of FIG. 1.
Figure 3:
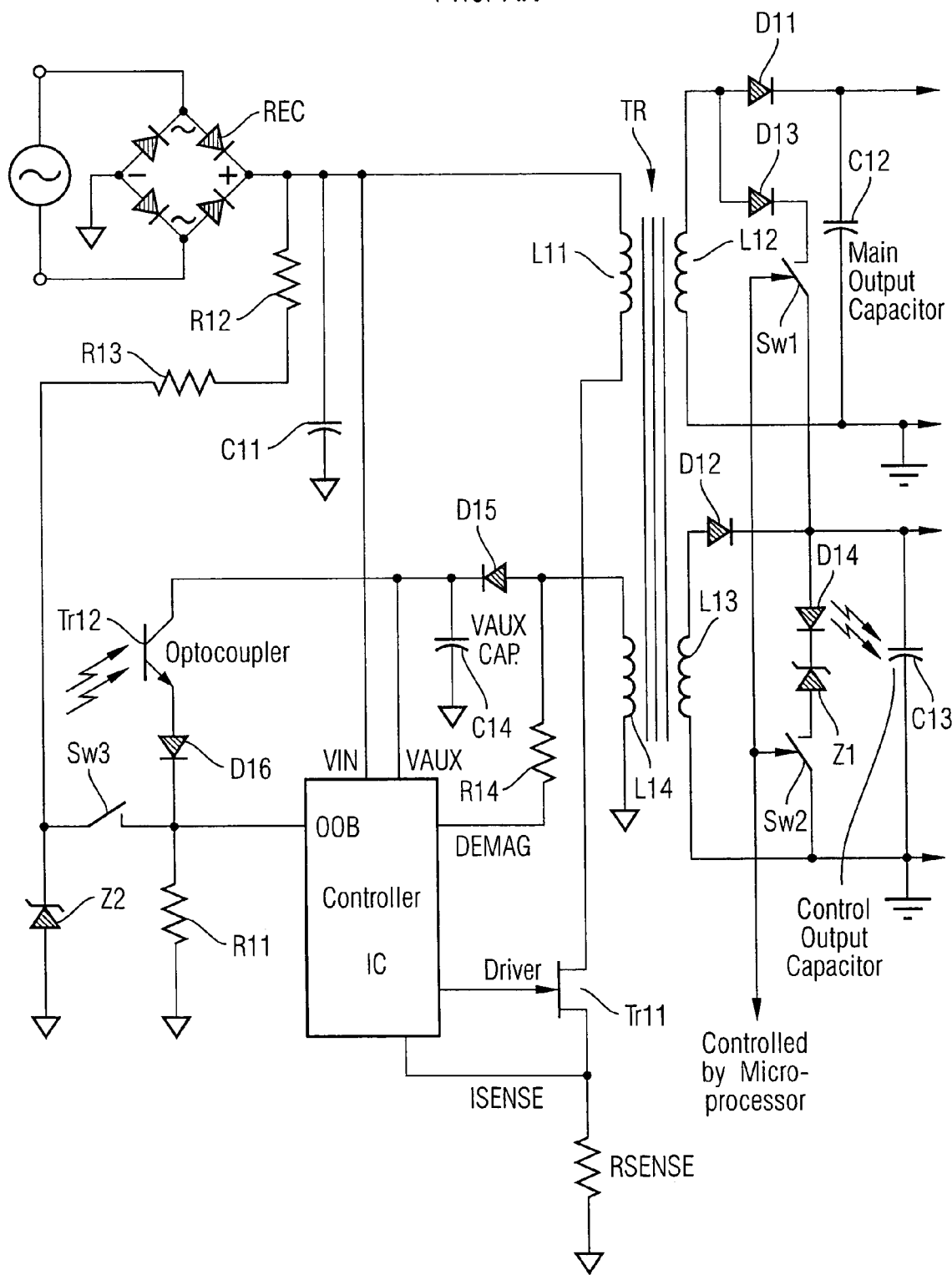
FIG. 3 is a diagram of a second known switched mode power supply.
Figure 4:
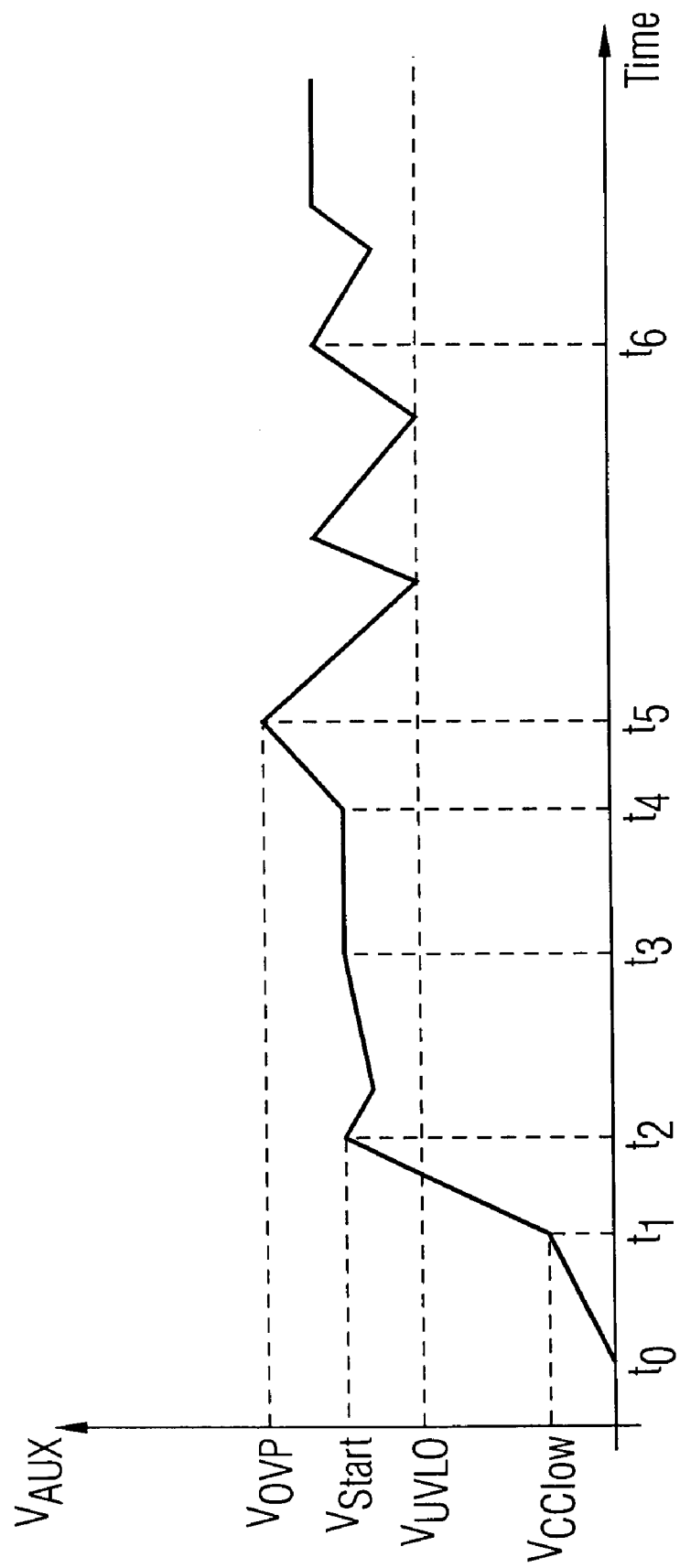
FIG. 4 is a graph showing variation of $V_{AUX}$ in FIG. 3 over time.
Figure 5:
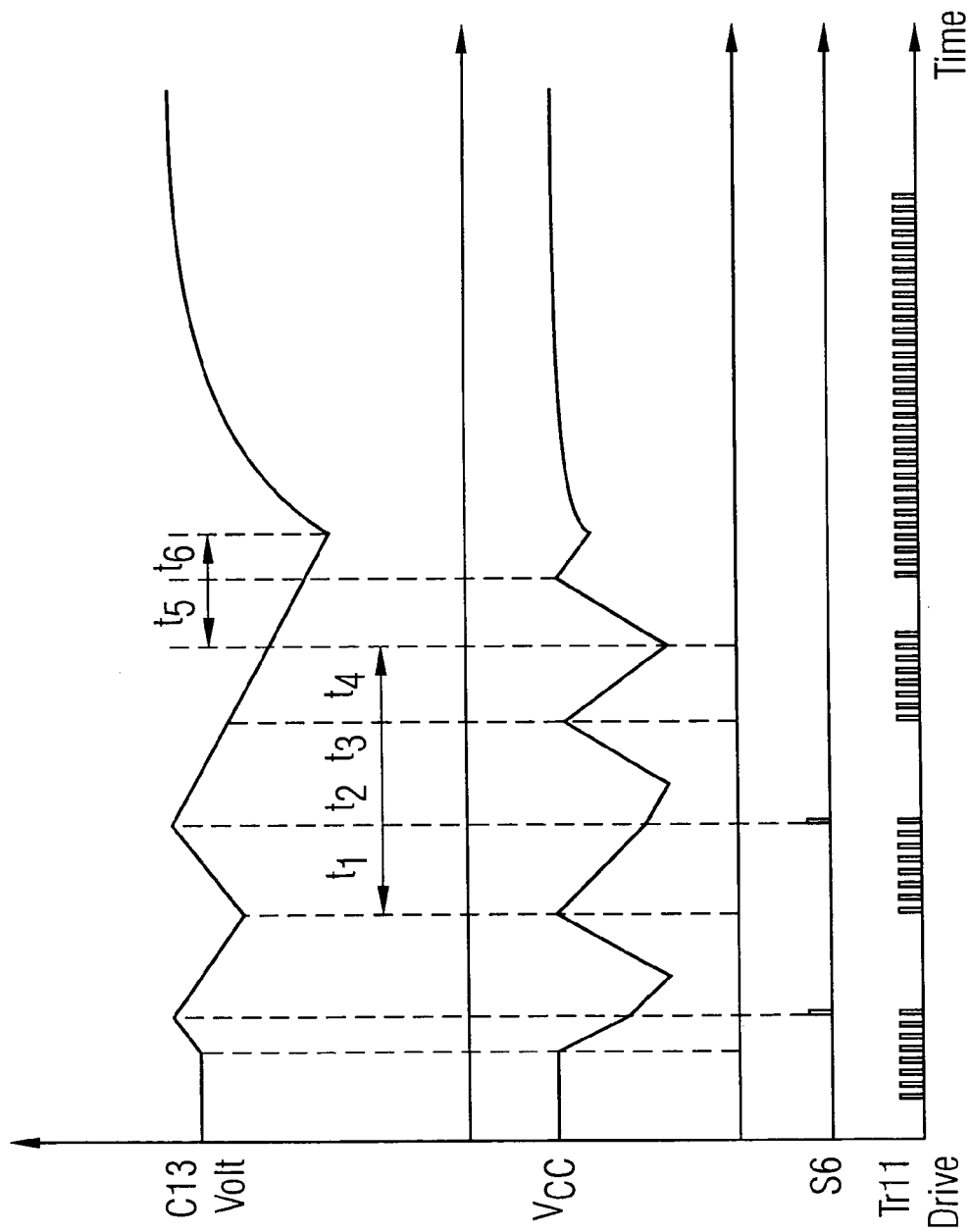
FIG. 5 is a graph showing variation of the voltage across the control output capacitor, $V_{AUX}$, burst mode signal S6 and the drive signal over time.
Figure 6:
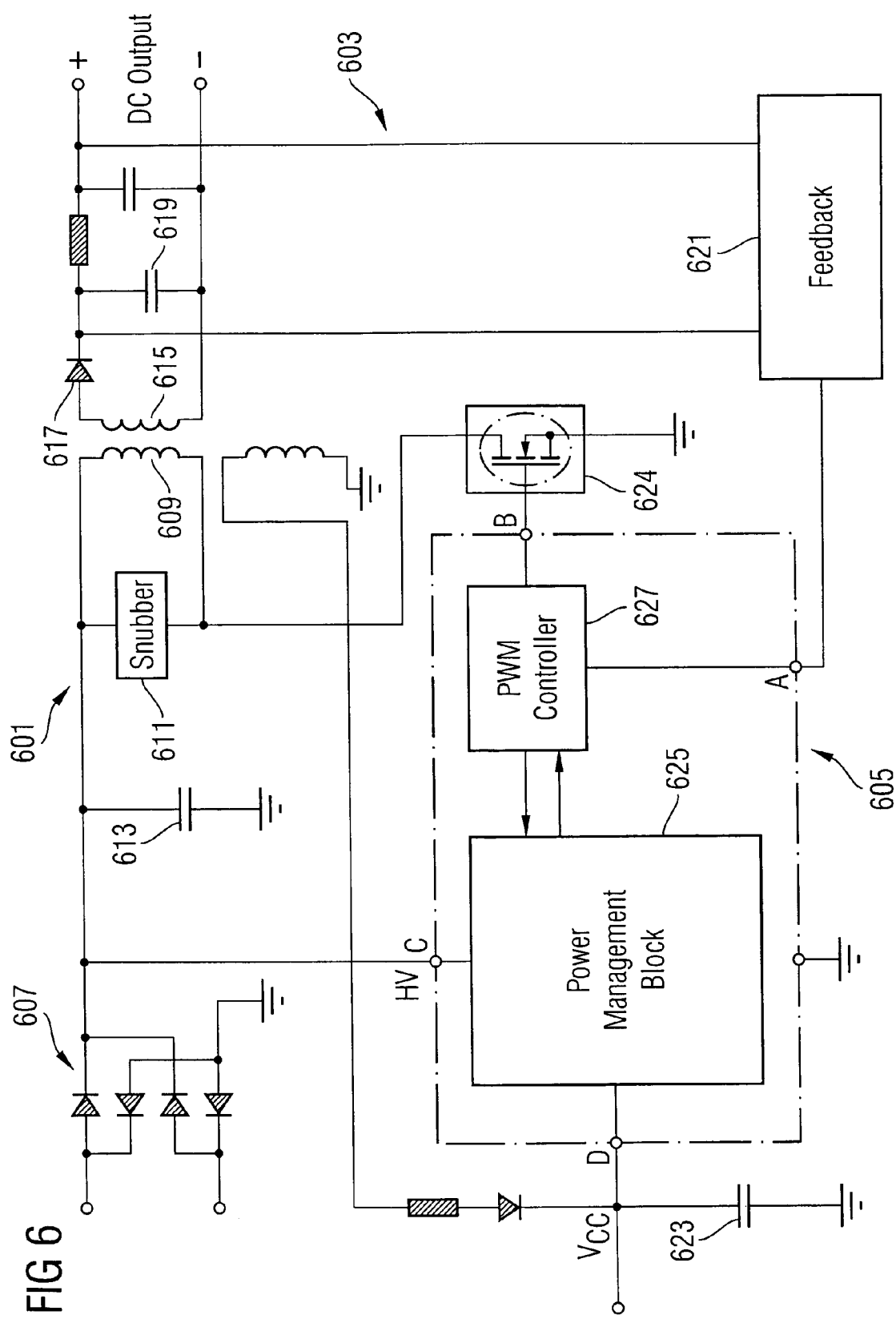
FIG. 6 shows a switched mode power supply according to an embodiment of the invention.
Figure 7:
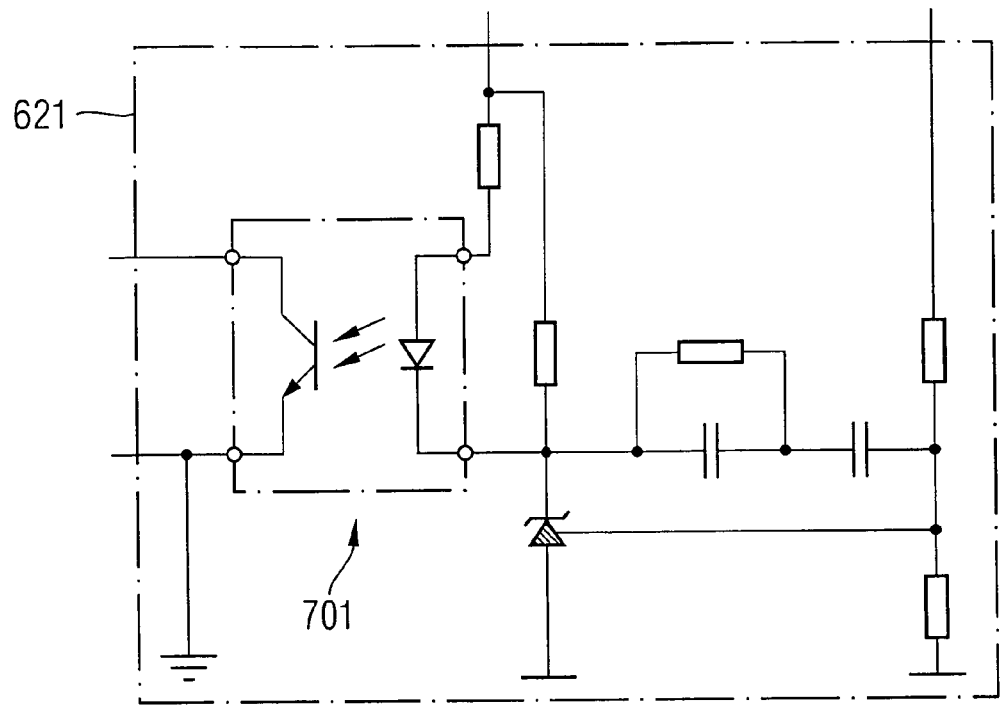
FIG. 7 shows one arrangement of the feedback circuit of FIG. 6.

A preferred embodiment of the invention will now be described, by way of example only, with reference to FIGS. 6 to 10, of which:

FIG. 6 shows a switched mode power supply according to an embodiment of the invention. The power supply includes a primary side 601, a secondary side 603 and a power controller 605. The primary side 601 includes a DC power source 607 (shown in FIG. 6 as an AC power source, a rectifier and a capacitor 613 dropped to ground to smooth the rectified DC voltage), a primary inductive winding 609 coupled to the power source 607 at one end and to the power controller 605 at the other end, and a snubber circuit 611. The function of the snubber circuit will be discussed below. The secondary side 603 includes a secondary inductive winding 615 (coupled to the winding 609 on the primary side), a rectifier 617, a feedback capacitor 619 and a feedback circuit 621. The transformer also includes an auxiliary winding. A possible arrangement for the feedback circuit 621 is shown in FIG. 7 although any suitable arrangement could be substituted. The advantage of the FIG. 7 arrangement is that an opto-coupler 701 is used so that the primary and secondary portions of the arrangement are electrically isolated. The secondary side 603 of the circuit provides a DC voltage to a load. The primary and secondary sides of the power supply of FIG. 6 may be the same as in conventional arrangements.

As already mentioned, the power supply also includes a power controller 605, which will now be described in more detail. The power controller 605 is coupled to a capacitor 623 providing supply voltage $V_{CC}$, and also to a MOSFET block 624. The drain of the MOSFET is coupled to the snubber circuit 611 in the primary side 601 of the circuit. The snubber circuit 611 is used to clamp the MOSFET drain-source voltage during switching transience. The MOSFET block 624 includes the MOSFET, but may also include other circuitry as required. The power controller 605 includes a Pulse Width Modulation (PWM) controller 627, which will be described in more detail with reference to FIG. 8 and a power management block 625, which will be described in more detail with reference to FIG. 9. The power management block 625 is coupled to $V_{CC}$ (PIN D), to the input DC voltage (PIN C—High Voltage (HV)) and to the PWM controller 627. The PWM controller is coupled to the power management block 625, the gate of the MOSFET in MOSFET block 624 (PIN B) and the output of the feedback circuit 621 (PIN A). If the power controller 605 is implemented in a single IC package, four output pins, marked A, B, C and D, plus a ground pin, may be used. For the purpose of current measurement, an additional pin is needed, which provides a channel of the current sensing signal to the PWM controller. (In the FIG. 6 arrangement, the MOSFET block 624 is shown outside the IC package, i.e., outside the dotted lines. However, the MOSFET block could instead be inside the IC package.)

Figure 8:
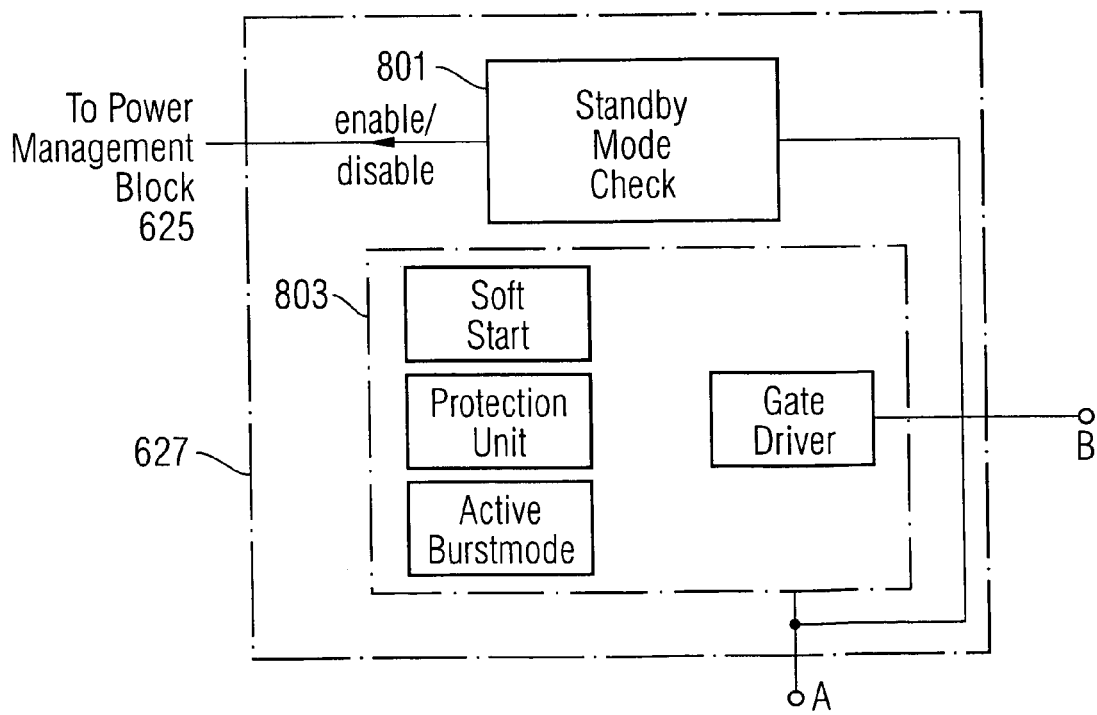
FIG. 8 shows one arrangement of the PWM controller of FIG. 6.

FIG. 8 shows the PWM controller 627 in more detail. The PWM controller 627 includes a standby mode check 801 (which outputs either an ENABLE signal or a DISABLE signal and will be described further below) and a PWM block 803. The standby mode check 801 is coupled to the feedback circuit 621 and its output is coupled to the power management block 625. The PWM block 803 performs several known functions including soft start, active burst mode and protection. It should be noted that, although the standby mode check 801 and the PWM block 803 are shown as completely separate and independent blocks, in reality, their functions may well overlap and components may be shared. In any case, the arrangement of the PWM controller 627 may be well known in the art.

Figure 9:
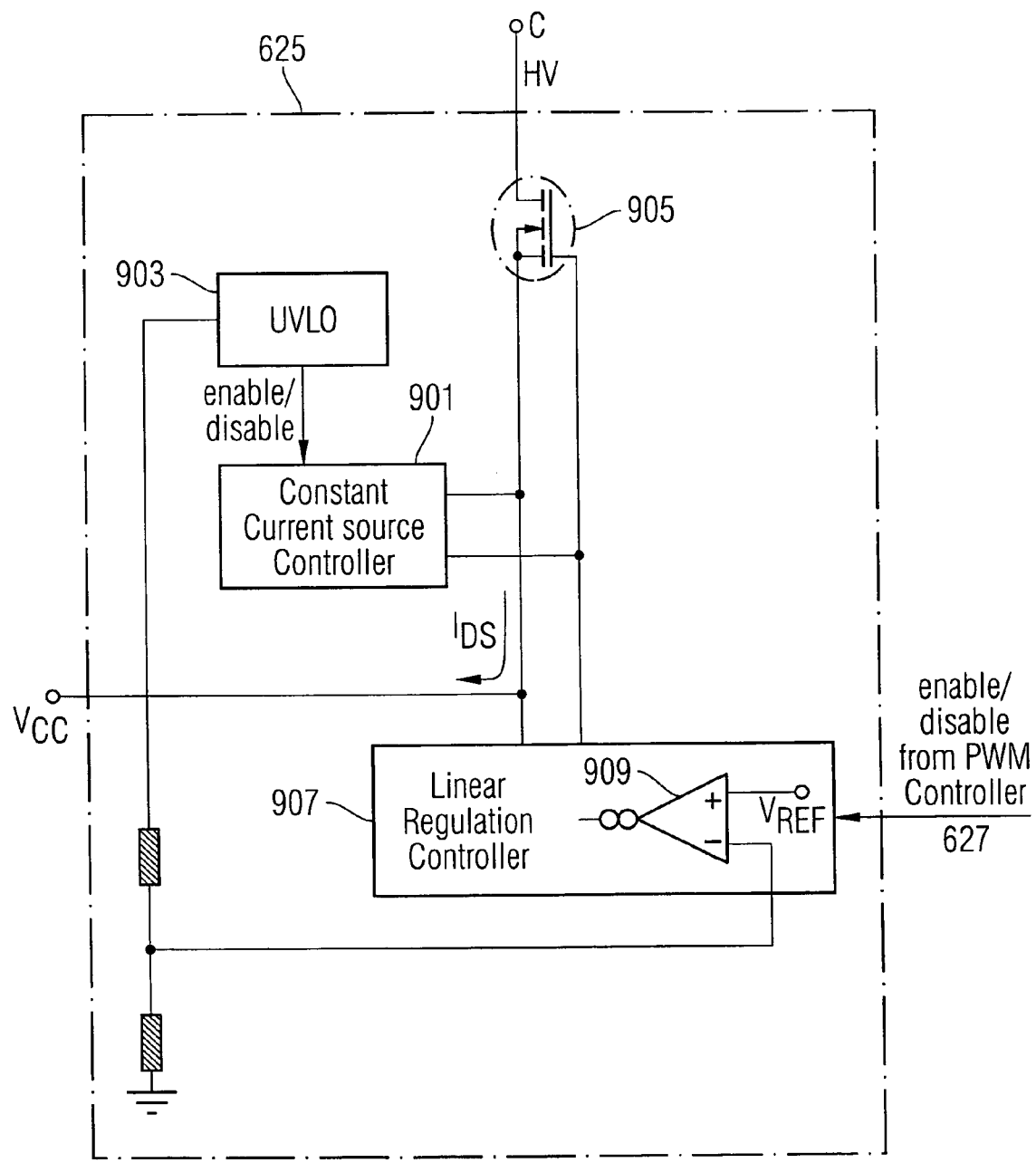
FIG. 9 shows a preferred arrangement of the power management block of FIG. 6.

FIG. 9 shows the power management block 625 in more detail. The power management block 625 includes a current controller in the form of a constant current source controller 901, an under voltage lock out (UVLO) block 903, a high voltage device in the form of MOSFET 905 (coupled to high voltage pin C) and a regulation controller in the form of linear regulation controller 907, which includes a comparator in the form of differential amplifier 909. UVLO block 903 is coupled to $V_{CC}$ and provides an ENABLE/DISABLE input to the constant current source controller 901, as will be described further below. $V_{CC}$ is coupled to the source of MOSFET 905. The constant current source controller 901 is coupled to the gate and source of MOSFET 905. The linear regulation controller 907 is also coupled to the gate and source of MOSFET 905. An ENABLE/DISABLE input to the linear regulation controller 907 is provided by the PWM controller's 627 standby mode check block 801, as discussed previously. The differential amplifier 909, in the linear regulation controller 907, is coupled to a reference voltage $V_{REF}$ at one of its inputs and to downscaled $V_{CC}$ at the second of its inputs.

Note that, in this embodiment, MOSFET 905 is shown shared between the constant current source controller 901 and the linear regulation controller 907. Whilst this is the preferred arrangement, it is possible for the constant current source controller and the linear regulation controller to have separate MOSFETs. It is also possible for the MOSFET(s) to be replaced with another type of high voltage device, for example a JFET.

Operation of the switched mode power supply of FIGS. 6 to 9 will now be described with reference to FIG. 10. The operation can be separated into three phases: start-up mode, normal mode and standby mode.

1. Start-Up Mode

During start-up, the capacitor 623 is charging up so as to increase $V_{CC}$ as shown in plot a. The output of the UVLO is logical low (see plot b) and is supplying an ENABLE input to the constant current source controller 901. Thus, constant current source controller 901 is enabled. The constant current source controller 901 supplies a voltage across its two output terminals, i.e., across the gate-source of MOSFET 905, which results in a constant current flowing through the drain-source of MOSFET 905 to the $V_{CC}$ line. That current charges up the capacitor 623 and the voltage across the capacitor rises at a constant rate. During start-up, the output of standby mode check block is logical high (see plot c), which means that a DISABLE input is being provided to the linear regulation controller 907. Linear regulation controller 907 is therefore disabled. During start-up, the current for charging the capacitor is constant and is supplied through MOSFET 905 under control of the constant current source controller 901.

2. Normal Mode

Once capacitor 623 has been charged up enough that $V_{CC}$ reaches a predetermined level, the output of the UVLO (which is coupled to the $V_{CC}$) goes to logical high (see plot b) so a DISABLE input is being supplied to the constant current source controller 901. The constant current source controller 901 is, therefore, disabled and capacitor 623 is no longer charged by the constant current source, but by the auxiliary winding. (Generally, the constant current source controller is only enabled during start-up; during normal mode and standby mode, the constant current source controller is disabled.) This can be seen in plot a wherein the steady increase of $V_{CC}$ during start-up mode ceases once UVLO's output goes logical high. The output of the standby mode check is still logical high (see plot c) so that the input to linear regulation controller 907 is still DISABLE and the linear regulation controller 907 is still disabled. Power supply to the controller comes from the auxiliary winding during normal mode operation and, because both the constant current source controller 901 and the linear regulation controller 907 are disabled, only the leakage current flows through pin C and power losses in the high voltage device are quite low.

3. Standby Mode

During normal operation, the standby mode check 801 checks the feedback 621 to determine whether to switch to standby mode from normal mode or to switch back to normal mode from standby mode. Once the PWM controller is switched to standby mode, the output of the standby mode check 801 goes to logical low (see plot c), so that the linear regulation controller 907 is enabled. Note that, during standby mode, the constant current source controller 901 is still disabled (because the DISABLE input is still being supplied from UVLO). Note also that the linear regulation controller 907 is enabled only during standby mode and is disabled during start-up and mode and normal mode.

Once the linear regulation controller 907 is enabled, the differential amplifier 909 compares $V_{CC}$ with the reference voltage $V_{REF}$. When $V_{CC}$ is higher than or equal to $V_{REF}$ (which indicates that capacitor 623 is sufficiently charged for the operation) the linear regulation controller 907 supplies a voltage across its two output terminals such that the drain-source current flowing through MOSFET 905 is practically zero. (In practice, there may be leakage currents flowing but these will be small.) However, when $V_{CC}$ is less than $V_{REF}$ (which indicates that the capacitor 623 must be charged up), the linear regulation controller supplies a voltage across its two output terminals, i.e., across the gate-source of MOSFET 905 resulting in a drain-source current flowing through MOSFET 905 to the $V_{CC}$ line, which charges up the capacitor 623. The amount of drain-source current flowing is controlled by the difference between $V_{CC}$ $V_{REF}$. Thus, the more the capacitor needs to be charged up, i.e., the greater the difference between $V_{CC}$ and $V_{REF}$, the greater the drain-source current flowing to the $V_{CC}$ line. Thus, as the capacitor 623 charges up, the difference between $V_{CC}$ and $V_{REF}$ decreases, which results in a corresponding reduction in flowing drain-source current. As $V_{CC}$ approaches $V_{REF}$, the gate-source voltage is controlled to make the drain-source current flow reach zero. In this way, very good regulation of $V_{CC}$ may be achieved.

Therefore, preferred embodiments of the invention have a number of advantages over the prior art. Firstly, this is a more efficient solution to supply the PWM controller because the constant current source controller supplies the power during start-up, the auxiliary winding provides power during normal mode, and the linear regulation controller provides power only during standby mode. Secondly, because $V_{CC}$ during standby mode is maintained by linear regulation, the PWM controller is always active and monitors the feedback voltage continuously. As a result, the power supply and the output voltage are better regulated (note the fairly flat line in plot a), such that the converter generally has a very good load response.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A power controller for a switched mode power supply, the power supply operable in a start-up mode, a normal mode and a standby mode, the power controller comprising:
   a regulation controller for regulating a DC supply voltage on a supply line during the standby mode; and
   a high voltage device coupled to a DC input voltage and the supply line, current through the high voltage device to the supply line, during the standby mode, being controlled by the regulation controller;
   wherein, during the standby mode,
   when the supply voltage is greater than or equal to a reference voltage, the current through the high voltage device to the supply line is substantially zero and,
   when the supply voltage is less than the reference voltage, the greater the difference between the supply voltage and the reference voltage, the greater the current through the high voltage device to the supply line.

2. A power controller according to claim 1 wherein the regulation controller comprises a comparator for comparing the supply voltage with the reference voltage.

3. A power controller according to claim 1, wherein the regulation controller controls the current through the high voltage device during the standby mode by outputting a voltage across two output terminals.

4. A power controller according to claim 1, wherein the regulation controller is a linear regulation controller and, during the standby mode, when the supply voltage is less than the reference voltage, the current through the high voltage device to the supply line is arranged to be proportional to the difference between the supply voltage and the reference voltage.

5. A power controller according to claim 1, wherein the regulation controller is arranged to be disabled when the power supply is operating in the start-up mode or the normal mode.

6. A power controller according to claim 1, further comprising a current controller for increasing the DC supply voltage on the supply line during the start-up mode.

7. A power controller according to claim 6, wherein the current through the high voltage device during the start-up mode is controlled by the current controller.

8. A power controller according to claim 5, wherein the current controller controls the current through the high voltage device during the start-up mode by outputting a voltage across two output terminals.

9. A power controller according to claim 8, wherein the voltage across the two output terminals of the current controller during the start-up mode is controlled so that the current through the high voltage device to the supply line, during start-up mode, is substantially constant.

10. A power controller according to claim 6, wherein the current controller is arranged to be disabled when the power supply is operating in the normal mode or the standby mode.

11. A power controller according to claim 1, wherein the high voltage device is a MOSFET, the drain of the MOSFET being coupled to the DC input voltage and the source of the MOSFET being coupled to the supply line.

12. A power controller according to claim 1, wherein the high voltage device is a JFET, the drain of the JFET being coupled to the DC input voltage and the source of the JFET being coupled to the supply line.

13. A switched mode power supply operable in the start-up mode, the normal mode and the standby mode comprising the power controller of claim 1.

14. A switched mode power supply operable in a start-up mode, a normal mode and a standby mode, the power supply comprising:
   a transformer comprising a primary winding on a primary side and a secondary winding on a secondary side, the primary winding being coupleable to a DC input voltage and circuitry on the secondary side being arranged to provide a DC output voltage;
   a regulation controller for regulating a DC supply voltage on a supply line during the standby mode; and
   a high voltage device coupled to the DC input voltage and the supply line, current through the high voltage device to the supply line, during the standby mode, being controlled by the regulation controller;

wherein, during the standby mode, when the supply voltage is greater than or equal to a reference voltage, the current through the high voltage device to the supply line is substantially zero and, when the supply voltage is less than the reference voltage, the greater the difference between the supply voltage and the reference voltage, the greater the current through the high voltage device to the supply line.

15. A power supply according to claim 14, wherein the regulation controller comprises a comparator for comparing the supply voltage with the reference voltage.

16. A power supply according to claim 14, wherein the regulation controller controls the current through the high voltage device during the standby mode by outputting a voltage across two output terminals.

17. A power supply according to claim 14, further comprising a current controller for increasing the DC supply voltage on the supply line during the start-up mode.

18. A power supply according to claim 17, wherein the current through the high voltage device during the start-up mode is controlled by the current controller.

19. A power supply according to claim 18, wherein the current controller controls the current through the high voltage device during the start-up mode by outputting a voltage across two output terminals.

20. A power supply according to claim 19, wherein the voltage across the two output terminals of the current controller during the start-up mode is controlled so that the current through the high voltage device to the supply line, during start-up mode, is substantially constant.

21. A power supply according to claim 18, wherein the current controller is arranged to be disabled when the power supply is operating in the normal mode or the standby mode and the regulation controller is arranged to be disabled when the power supply is operating in the start-up mode or the normal mode.

22. A power supply according to claim 14, wherein the high voltage device is a MOSFET, the drain of the MOSFET being coupled to the DC input voltage and the source of the MOSFET being coupled to the supply line.

23. A power supply according to claim 14, wherein the high voltage device is a JFET, the drain of the JFET being coupled to the DC input voltage and the source of the JFET being coupled to the supply line.

24. A power supply according to claim 14, further comprising a feedback circuit coupling the secondary side to the primary side.

25. A power supply according to claim 24, further comprising a check box coupled to the feedback circuit for checking when the power supply is switched to and from the standby mode.

26. A power supply according to claim 25 wherein the check box is coupled to the regulation controller and is arranged to enable the regulation controller when the power supply is switched to the standby mode from the normal mode and disable the regulation controller when the power supply is switched from the standby mode to the normal mode.

27. A method for regulating a supply voltage on a supply line during a standby mode, in a power supply operable in a start-up mode, a normal mode and the stand-by mode, the method comprising:

providing a high voltage device coupled to a DC input voltage and the supply line;

comparing the supply voltage with a reference voltage;

if the supply voltage is greater than or equal to the reference voltage, controlling current through the high voltage device to the supply line to be substantially zero; and if the supply voltage is less than the reference voltage, controlling current through the high voltage device to the supply line such that the greater the difference between the supply voltage and the reference voltage, the greater the current through the high voltage device to the supply line.

* * * * *